(12) United States Patent
Mende (10) Patent No.: US 10,281,563 B2
(45) Date of Patent: May 7, 2019

(54) METHOD AND DEVICE FOR DETERMINING A DETECTION RANGE OF A TRAFFIC ROUTE

(71) Applicant: S.M.S. SMART MICROWAVE SENSORS GMBH, Braunschweig (DE)

(72) Inventor: Ralph Mende, Braunschweig (DE)

(73) Assignee: S.M.S. SMART MICROWAVE SENSORS GMBH, Braunschweig (DE)

( * ) Notice: Subject to any disclaimer, the term of this patent is extended or adjusted under 35 U.S.C. 154(b) by 548 days.

(21) Appl. No.: 14/769,140

(22) PCT Filed: Feb. 11, 2014

(86) PCT No.: PCT/EP2014/000365
§ 371 (c)(1),
(2) Date: Aug. 20, 2015

(87) PCT Pub. No.: WO2014/127891
PCT Pub. Date: Aug. 28, 2014

(65) Prior Publication Data
US 2015/0378009 A1    Dec. 31, 2015

(30) Foreign Application Priority Data

Feb. 22, 2013   (DE) .................. 10 2013 002 994

(51) Int. Cl.
*G01S 7/40* (2006.01)
*G08G 1/04* (2006.01)
(Continued)

(52) U.S. Cl.
CPC ............... *G01S 7/40* (2013.01); *G01S 13/91* (2013.01); *G01S 13/93* (2013.01); *G08G 1/04* (2013.01); *G08G 1/065* (2013.01); *G08G 1/08* (2013.01)

(58) Field of Classification Search
CPC . G01S 7/40; G01S 13/91; G01S 13/93; G01S 7/021; G01S 13/42; G01S 7/2923;
(Continued)

(56) References Cited

U.S. PATENT DOCUMENTS 3,760,343 A  *  9/1973  Auer, Jr. ............... G01S 7/2923
                                                    340/943
5,402,346 A     3/1995  Lion et al.
(Continued)

FOREIGN PATENT DOCUMENTS

CN      101251927 A      8/2008
DE      10314129 A1     10/2004
(Continued)

*Primary Examiner* — Peter M Bythrow
*Assistant Examiner* — Nuzhat Pervin
(74) *Attorney, Agent, or Firm* — W&C IP (57) ABSTRACT

The invention relates to a method for determining a detection range (12) of a traffic route (2) in which traffic participants can be detected by a transmitting and receiving device (4), wherein the transmitting and receiving device (4) is arranged at a device position in a device orientation and is designed to emit a transmitted radiation and to receive reflected transmitted radiation, wherein the method comprises the following steps: a) calculating a spatial detecting range of the transmitting and receiving device (4) at least also from the device position and the device orientation by means of a 3D model, b) determining an aerial detecting range in a measurement plane (10) from the spatial detecting range, and c) determining the detecting range (12) from the areal detecting range.

14 Claims, 5 Drawing Sheets

(51) Int. Cl.
  *G08G 1/08* (2006.01)
  *G01S 13/91* (2006.01)
  *G01S 13/93* (2006.01)
  *G08G 1/065* (2006.01)

(58) Field of Classification Search
  CPC . G08G 1/04; G08G 1/065; G08G 1/08; G01P 3/68; B61L 23/041; G01C 7/04
  USPC .......................................................... 342/165
  See application file for complete search history.

(56) References Cited

U.S. PATENT DOCUMENTS

| | | | | |
|---|---|---|---|---|
| 5,877,721 | A * | 3/1999 | Tsang | G01S 7/292 342/36 |
| 8,279,106 | B1 * | 10/2012 | Wittenberg | G01S 7/40 342/25 R |
| 8,596,587 | B2 * | 12/2013 | Hilleary | B61L 23/041 246/125 |
| 2004/0149939 | A1 * | 8/2004 | Dickson | G01P 3/68 250/559.12 |
| 2005/0213527 | A1 * | 9/2005 | Xie | H04W 16/28 370/315 |
| 2009/0102699 | A1 * | 4/2009 | Behrens | G01S 13/42 342/109 |
| 2010/0007545 | A1 * | 1/2010 | Nalezinski | G01S 7/021 342/104 |
| 2011/0295552 | A1 * | 12/2011 | Saarenketo | G01C 7/04 702/152 |
| 2012/0307065 | A1 * | 12/2012 | Mimeault | G08G 1/04 348/149 |

FOREIGN PATENT DOCUMENTS

| | | |
|---|---|---|
| DE | 102009053509 A1 | 5/2011 |
| EP | 1464984 A1 | 10/2004 |
| GB | 2266207 A | 10/1993 |
| JP | 50142197 | 11/1975 |
| JP | 000H06194443 A | 7/1994 |
| JP | 2004-272842 A | 9/2004 |
| JP | 2012203794 A | 10/2012 |

* cited by examiner

METHOD AND DEVICE FOR DETERMINING A DETECTION RANGE OF A TRAFFIC ROUTE

BACKGROUND OF THE INVENTION

Field of the Invention

The invention relates to a method for determining a detection region of a traffic route in which traffic participants can be detected by a transmitting and receiving device. The invention also relates to a method for determining a required position and a required orientation of at least one transmitting and receiving device, as well as an apparatus for carrying out one of said methods.

Background Description

The detection of traffic participants who are located on a traffic route must be achieved reliably nowadays in a wide range of application fields. Traffic nodes in particular, junctions for example, or particularly heavily frequented traffic routes are of interest here.

It is, for example, known, for the purposes of switching traffic lights as required, to first detect whether a traffic participant is at all present on that part of the traffic route to which the traffic light applies. This is for example nowadays achieved by induction loops laid in the road surface which can detect a vehicle standing above them. It is, however, disadvantageous that this technology is associated with an increased expense, in particular when traffic light installations and junctions are upgraded with this technology, since the induction loops must be inserted into the road surface. This requires the road to be blocked, so that in some cases significant traffic blockages result.

The detection of traffic participants located on a traffic route is, for example, also of interest in the context of traffic monitoring and traffic management. Thus, for example, the number of traffic participants on a road is often critical for the construction of a bypass or the further development of existing traffic routes. This is implemented, for example, by means of camera arrangements in which cameras film the traffic route to be monitored and then, for example using image recognition software, the number of traffic participants present is determined. It is, however, disadvantageous that the pollution often existing and arising in particular at large traffic routes can heavily impair the functional capability of the cameras. In addition it is difficult to monitor a traffic route in the night.

All of these disadvantages can be overcome if, instead of induction loops or camera-based systems, transmitting and receiving devices, for example for electromagnetic radiation, are used, which emit a transmitted radiation that is reflected by the traffic participants to be detected, and then received again by the receiving part of the transmitting and receiving device. This raises the question, however, of how such transmitting and receiving devices can be optimally placed and aligned. This problem, naturally, does not occur with induction loops. Camera-based systems can easily be adjusted and aligned by looking at the monitor on which the image acquired by the camera is displayed. This is not possible in this simple manner with transmitting and receiving devices which, for example, emit transmitted radiation that is not visible to the human eye.

SUMMARY OF THE INVENTION

The invention is therefore based on the object of providing a method for determining a detection region of a traffic route in which traffic participants can be detected by a transmitting and receiving device.

A method is also to be proposed with which a required position and a required orientation of associated transmitting and receiving devices can be determined. Apparatuses should also be proposed with which these methods can be carried out.

The invention achieves the set object through a method for determining a detection region of a traffic route in which traffic participants can be detected by a transmitting and receiving device, wherein the transmitting and receiving device is arranged at a device position in a device orientation and is installed such as to emit a transmitted radiation and to receive reflected transmitted radiation, wherein the method comprises the following steps:

a) calculation of a spatial detection region of the transmitting and receiving device at least also from the device position and the device orientation by means of a 3D model,
b) determination of an area detection region in a measurement plane from the spatial detection region and
c) determination of the detection region from the area detection region.

In the first method step, therefore, a spatial detection region is determined from known parameters, such as for example the device position and the device orientation in which the transmitting and receiving device is arranged. This is done by means of a 3D model, wherein other known parameters can be included in the calculations. These can, for example, comprise the structural nature of the traffic route, such as for example buildings, different road lanes, signs and other objects that are present. In addition, parameters that influence the transmitted radiation, such as for example temperatures and air humidity, can be included. The spatial intensity distribution is, for example, determined from the 3D model, which states, for points in a previously selected spatial region, what intensity of the emitted transmitted radiation reaches this point. A three-dimensional, and therefore spatial, intensity distribution results.

As an alternative to the spatial intensity distribution of the transmitted radiation that can be emitted, it is also possible, for example, to determine from the 3D model for each position the intensity of the radiation that would be emitted by the transmitting and receiving device, would be reflected by a standard body or test body at the respective position, and then detected by the transmitting and receiving device. In this way again a three-dimensional detection region is created, wherein the intensity that would be received by the detector of the transmitting and receiving device can be assigned to every spatial position.

From this spatial intensity distribution, or from the spatial detection region, an area detection region is determined in that, for example, the individual intensity values of the spatial detection region that belong to points that are located in one plane are extracted. This plane is what is known as the measurement plane, and can be shifted and/or inclined with respect to the traffic route. It is assumed in what follows that the traffic route, for example a road, has a planar construction. The fact that, for example, roads can be built to slope away to the edges to encourage for example rainwater to flow away, will therefore be neglected.

The detection region is then determined from the area detection region found in this way.

Preferably at least one transmission lobe and at least one reception lobe of the transmitting and receiving device are taken into account in the 3D model. It has been found particularly advantageous for the transmission lobes of all the transmitters and/or the reception lobes of all the receivers or detectors of the transmitting and receiving device to be taken into account in the three-dimensional model. It is also possible for different transmitters and receivers to be modeled, so that even, for example, for different traffic routes, for example different junctions, different transmitting and receiving devices can be modeled and combined.

It is not essential for structural features or information about the corresponding traffic routes, junctions for example, to be contained in the 3D model. It can for example be sufficient for the positioning of corresponding sensor equipment with transmitting and receiving devices on vehicles for information relating to the position and type of the transmitting and receiving devices on the vehicle to be processed in the 3D model. With a 3D model of this sort, consequently, a detection region of, for example, a traffic route is determined which is, for example, located in front of a vehicle or in the surroundings of a vehicle. For example, different driving maneuvers, such as, for example, travelling straight ahead or turning of the respective vehicle can be taken into account.

Advantageously the spatial detection region comprises all those positions for which an intensity of the radiation which was emitted by the transmitting and receiving device, reflected by a test body, in particular a standard body, located at the position, and detected by the transmitting and receiving device exceeds a predetermined limit value. The three-dimensional image created in this way is also referred to as a system lobe, and provides information as to the extent to which the transmitted radiation emitted by the transmitting and receiving device is detected by the transmitting and receiving device after it has been reflected by a test body at the respective position. Preferably the test body is here modeled in such a way that it exhibits the greatest possible similarity to the traffic participants who are to be detected. This similarity relates preferably on the one hand to the geometrical shape and size of the test body, and on the other hand to the reflectivity for the respective transmitted radiation.

Different transmitting and receiving devices are necessary for monitoring different traffic routes. If therefore the detection region of a transmitting and receiving device that is intended to monitor a traffic route used at least almost exclusively by pedestrians is to be determined, then as a test body a body preferably as similar as possible to a pedestrian should be modeled, unless, for comparability with other simulations or methods, a standard body is to be used. If the traffic route to be monitored, on the other hand, is used, for example, primarily by commercial vehicles, a test body similar to a commercial vehicle should be modeled.

Alternatively or in addition, the spatial intensity distribution of the transmitted radiation that can be emitted by the transmitting and receiving device can be calculated as the spatial detection region, and an area intensity distribution determined from the spatial intensity distribution as the area detection region. In this case, the computing effort required is significantly reduced, since a test body or standard body is not modeled, and no reflections of the emitted transmitted radiation need to be calculated. This method is in particular helpful if the transmission lobes and the reception lobes of the transmitting and receiving device are very similar or even identical, because, for example, antennas of the same construction are used. When using these intensity distributions, the effect of the reception lobes is not necessarily included in the 3D model, but can, however, be taken into account in order to improve the quality of the result. The advantage of this method lies in the reduced computing effort, so that the method can be carried out more quickly and economically.

Advantageously a point in the measurement plane is biuniquely assigned to each point of the traffic route, wherein the detection region is that region in which the area intensity distribution determined, or the value of the area detection region, exceeds or reaches a predetermined limit value at the assigned points of the measurement plane.

The biunique assignment of the point of the traffic route to a point of the measurement plane can, for example, be achieved through the perpendicular projection of the measurement plane onto the traffic route. In other words, each point of the traffic route is assigned to that point of the measurement plane that is located vertically above the point of the traffic route. It is now possible to extract from the area intensity distribution determined or the area detection region, the points for which the incident intensity of the emitted transmitted radiation, or the value of the area detection region, for example the reflected transmitted radiation measured by the receiver, exceeds or reaches a predetermined limit value. The points for which this is the case constitute the detection region. The limit value itself is here helpfully selected such that a traffic participant that is exposed to the emitted transmitted radiation and reflects it, returns a sufficient quantity of the transmitted radiation to the transmitting and receiving device that this reflected transmitted radiation can be detected. The limit value here can for example be made to depend on the geometrical shape of the respective traffic participant that is to be detected. Thus for example, a pedestrian reflects significantly less of the emitted transmitted radiation than does, for example, a large commercial vehicle. Since a high proportion of the incident transmitted radiation is reflected by large traffic participants, these traffic participants can still be detected even when the incident area intensity is smaller, so that for these traffic participants, a lower predetermined limit value can be selected, and thus the detection region can be enlarged.

Advantageously a radiation lobe shape and/or the parameters of the transmitting and receiving device that determine shape of the radiation lobe are used as variables in the 3D model. The transmitted radiation can, for example, be radar radiation or another electromagnetic radiation, but may also be ultrasonic waves which here are also to be understood under the term "transmitted radiation". The transmitted radiation is here emitted by a transmitting antenna that is part of the transmitting and receiving device. It is possible here to employ different transmitting antennas with different radiation characteristics, and therefore different radiation lobe shapes of the emitted transmitted radiation. In order to be able to calculate the spatial intensity distribution with the 3D model as effectively and as close to reality as possible, these different radiation lobe shapes, or at least the parameters that determine them, are used in the 3D model.

For the determination of the detection region, not only are the radiation lobe shapes of the transmitting antenna of the transmitting and receiving device of interest, but also the reception regions and the reception lobes of the receiving antennas which determine what angular range and from what direction radiation reflected by traffic participants can be received by the receiving part of the transmitting and receiving device. When "radiation lobes", "transmitting antennas" and "receiving antennas" are spoken of here and below, this does not signify any restriction to electromagnetic radiation. Ultrasonic waves can also be used, and are understood here as transmitted radiation. A transmitting or receiving antenna is then a transmitting or receiving device suitable for the emission or reception of ultrasonic waves.

The individual radiation lobes of the transmitting and receiving device can here for example be measured in a measuring chamber using sensors. Alternatively or in addition it is also possible to model and determine theoretically the radiation lobe shape, for example from the structural shape and/or other parameters. This applies equally to transmitting and to receiving radiation lobes.

It has been found to be advantageous for the measurement plane to be shifted parallel to the traffic route. The distance between the traffic route and the measurement plane can here be between 10 cm and 140 cm, preferably between 20 cm and 100 cm, particularly preferably between 40 cm and 80 cm, and most particularly 50 cm. Traffic participants to be detected move in this region, so that the detection region should also be determined such that the measurement plane has this distance from the traffic route. It is naturally also conceivable for a different distance between the traffic route and the measurement plane, or even a measurement plane that is shifted to a non-parallel position, to be used. If, for example, only particularly high traffic participants, large commercial vehicles for example, are to be detected, it may be helpful in some circumstances to place the measurement plane at a height of, for example, between 200 cm and 250 cm.

Depending on the traffic route being monitored, and the traffic participants to be detected, measurement planes can also be placed quite differently. It is thus for example possible to use the transmitting and receiving device also for monitoring a part of the airspace, in order for example to determine whether an aircraft is approaching a wind power installation. In this case it is helpful to adjust the measurement plane to this situation. The measurement plane can thus for example be placed parallel to the modeled ground at a height of, for example, 100 meters or 600 meters. In this way it is possible to detect, for example, aircraft or other airborne vehicles at an early stage and for example to switch warning lights and positioning lights on wind power installations or other buildings on or off as required. In order here to establish how great is the range of the transmitting and receiving device, and in particular of the emitted transmitted radiation, it is also possible to arrange the measurement plane, for example, vertical and perpendicular to the emitted transmitted radiation. By shifting the measurement plane to different distances, for example between 5 kilometers and 8 kilometers, it is possible to establish the distance up to which aircraft can be detected by the emitted transmitted radiation with the given arrangement and orientation of the transmitting and receiving device and with what may be a selectable transmission power. This procedure can also be used in a similar manner for land or sea traffic routes to determine the range of the transmitting and receiving device.

Preferably the traffic route comprises a junction and/or a traffic light installation. The methods described here are, of course, not restricted to traffic routes that are roads and junctions. With transmitting and receiving devices that emit transmitted radiation, for example radar radiation, other traffic routes, such as for example railways or shipping routes such as canals, or pedestrian paths can also be monitored. The methods only change slightly as a result thereof, since different parameters are passed to the 3D model, and must be taken into account in the calculation of the spatial intensity distribution or of the spatial detection region. Depending on the traffic route being monitored and the traffic participants that it is desired to detect, it may also be necessary to adjust the position of the measurement plane.

The invention also achieves the object through a method for determining a required position and a required orientation of at least one transmitting and receiving device, in which the detection region satisfies at least one predetermined criterion, wherein the method comprises the following steps:

a) determination of the detection region according to a method described here for the transmitting and receiving device in a test position and in a test orientation;

b) acceptance of the test position as the required position and the test orientation as the required orientation, provided the detection region determined satisfies the at least one criterion, and changing the test position and/or the test orientation if the detection region determined does not satisfy the at least one criterion;

c) repetition of steps a) and b) until the detection region determined satisfies the at least one predetermined criterion.

A large number of possible device positions and device orientations in which the transmitting and receiving device can be positioned are often available at traffic routes that are to be monitored, for example junctions or other traffic nodes. These can, for example, be existing masts for lighting, signs or traffic lights, or may also be bridges or other constructed objects. The question therefore arises, of the position and the orientation at which the at least one transmitting and receiving device should optimally be arranged.

For this purpose at first at least one predetermined criterion is determined, which the detection region must satisfy. This can, for example, be a minimum extent along the traffic route, or a tightest possible limitation of the detection region on the traffic route. Any other desired criterion is of course also possible. In the first method step it is now assumed that the at least one transmitting and receiving device is arranged in a test position and a test orientation. For these parameters, the detection region is calculated using the described method. A check is then performed as to whether the detection region determined in this way satisfies the at least one predetermined criterion. If this is the case, the selected test position and the test orientation are confirmed as the required position and required orientation. The transmitting and receiving device can be arranged in this position and orientation. If the detection region determined does not satisfy the at least one predetermined criterion, the test position and/or the test orientation must be changed. The detection region is then again determined for these changed conditions. This is done until a test position and a test orientation are found in which the at least one predetermined criterion is satisfied. This is accepted as the required position and required orientation.

Preferably with a method of this type, the required positions and the required orientations of a plurality of transmitting and receiving devices are determined. This is in particular required and advantageous at junctions and nodes with several traffic routes. In this way, for example, the number of traffic participants arriving at the traffic node from different directions can be determined, or the number of different travel directions, for example those turning right or those turning left, can be determined.

If the required positions and required orientations of a plurality of transmitting and receiving devices are determined, this can be done in various ways. One possibility is to determine the required positions and the required orientations of the individual transmitting and receiving devices one after another. Accordingly at first, the detection region of a first transmitting and receiving device is determined, until the required position and required orientation are determined. After this, the method is repeated for a second and for each further transmitting and receiving device. It can be helpful here to specify the individual criteria that the detection regions of the individual transmitting and receiving devices must satisfy depending upon the detection regions that belong to the transmitting and receiving devices for which required positions and required orientations have already been determined. One criterion can, for example, be that the lowest possible overlap between the individual detection regions is ensured.

As an alternative to this procedure, it is also possible for the detection region of all the transmitting and receiving devices to be determined together at the same time. Again in this case, however, appropriate criteria, such as for example a minimum overlap between the individual detection regions, can be specified.

An apparatus according to the invention comprises an electrical or electronic controller that is designed to carry out one of the methods described here. Advantageously an apparatus of this sort can be a portable data-processing device, in particular a laptop, tablet computer or a smartphone. All other portable or non-portable, i.e. stationary, data-processing devices are of course also possible.

In all the methods mentioned so far, it is possible, in addition to the parameters for the transmitting part of the transmitting and receiving device, for parameters also to be included in the 3D model that are important for the receiving part of the transmitting and receiving device. These can, for example, be the opening angle of the respective sensors and detection devices used in the receiving device. These too can be selected and designed variably according to the orientation and position selected for the transmitting and receiving device, so that these too can be employed as criteria for the detection region.

BRIEF DESCRIPTION OF THE DRAWINGS

An exemplary embodiment of the present invention is explained below in more detail with the help of a drawing. Here FIGS. 1 to 4—show schematic plan views of a junction with a schematic representation of an area intensity distribution for differently positioned transmitting and receiving devices and FIG. 5—shows a schematic sectional view through a spatial intensity distribution with different measurement planes.

DETAILED DESCRIPTION THE INVENTION

Figure 1:
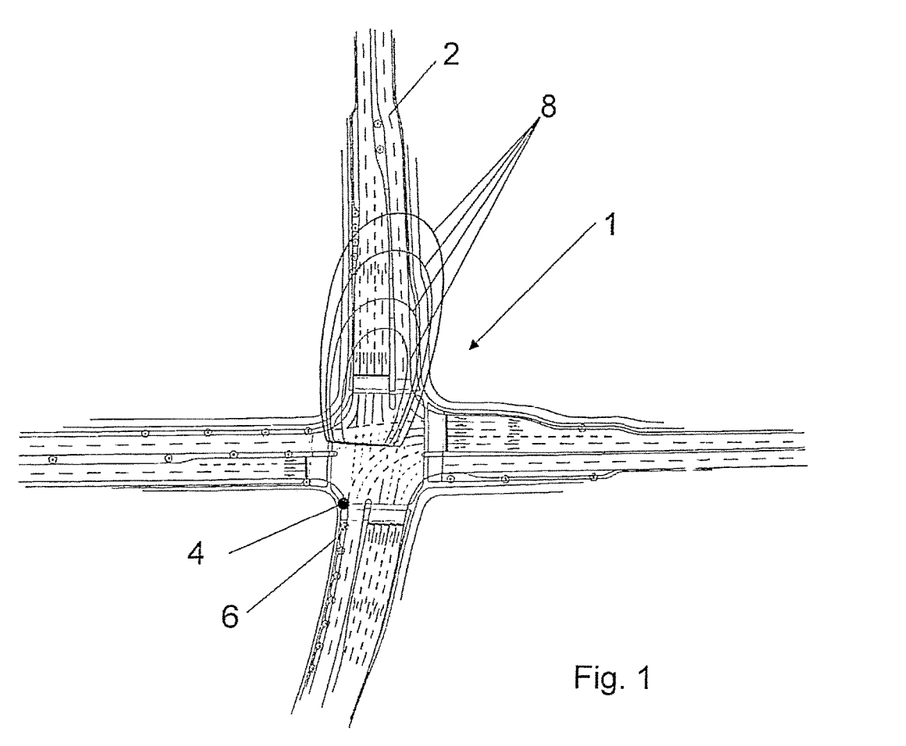

FIG. 1 shows a plan view of a junction 1 at which two traffic routes cross. The traffic route 2 coming from above in FIG. 1 is to be monitored by a transmitting and receiving device 4 such that traffic participants, not illustrated, who are on the traffic route 2 can be detected. It can be seen that the transmitting and receiving device 4 is arranged on the lower part of the traffic route 2 at the left edge, for example on a pedestrian path 6. Structural elements and infrastructure items that already exist, such as signs, lighting masts or traffic lights, can of course be used here. The transmitting and receiving device 4 emits a transmitted radiation, which can for example be radar radiation, on to the part of the traffic route 2 pointing upwards in FIG. 1. Depending on the device position and the device orientation of the transmitting and receiving device 4, a radiation lobe transmitted here can only reach a certain proportion of the traffic route 2, and can also therefore only detect traffic participants present in this region.

Four lines 8 are illustrated in FIG. 1, each of which joins points of identical intensity. The intensity drops away from the innermost line 8 to the outermost line 8. The lines 8 of identical intensity of the emitted transmitted radiation all lie in a measurement plane 10 which, in the exemplary embodiment shown in FIG. 1, lies parallel to the plane of the drawing, but shifted however with respect to the traffic route 2, as shown in the cross-sectional view of FIG. 5.

Figure 5:
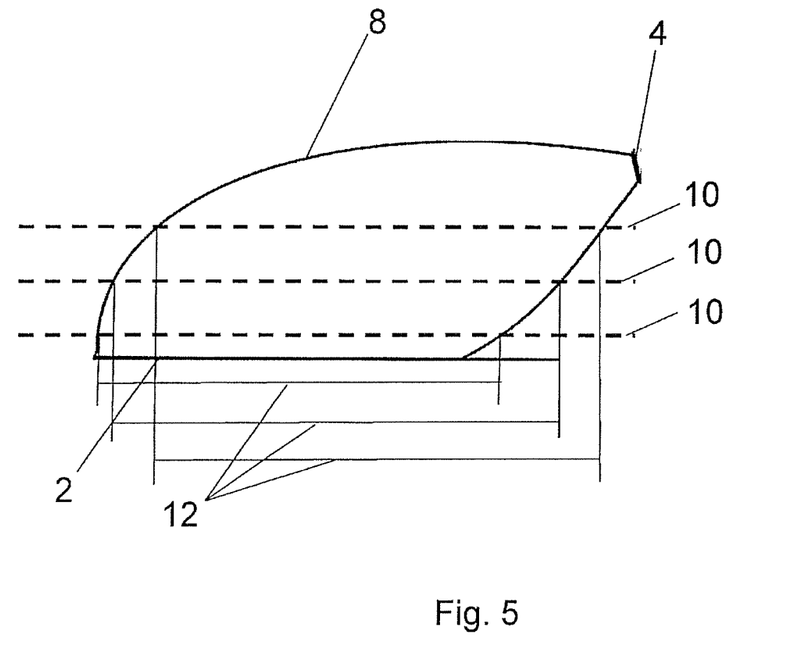

In order now to determine a detection region 12, which is illustrated in FIG. 5, the line 8 is selected on which the intensity of the incident transmitted radiation emitted by the transmitting and receiving device 4 reaches a predetermined limit value. The detection region 12 lies within this line 8, since here the intensity of the transmitted radiation exceeds the predetermined limit value.

The shape of the radiation lobes that are emitted by the transmitting and receiving device 4 are also advantageously included in the calculations of the spatial intensity distribution by means of the 3D model. In the exemplary embodiment shown in FIG. 1, the transmitting and receiving device 4 emits a relatively broad, and therefore relatively short, radiation lobe.

Figure 2:
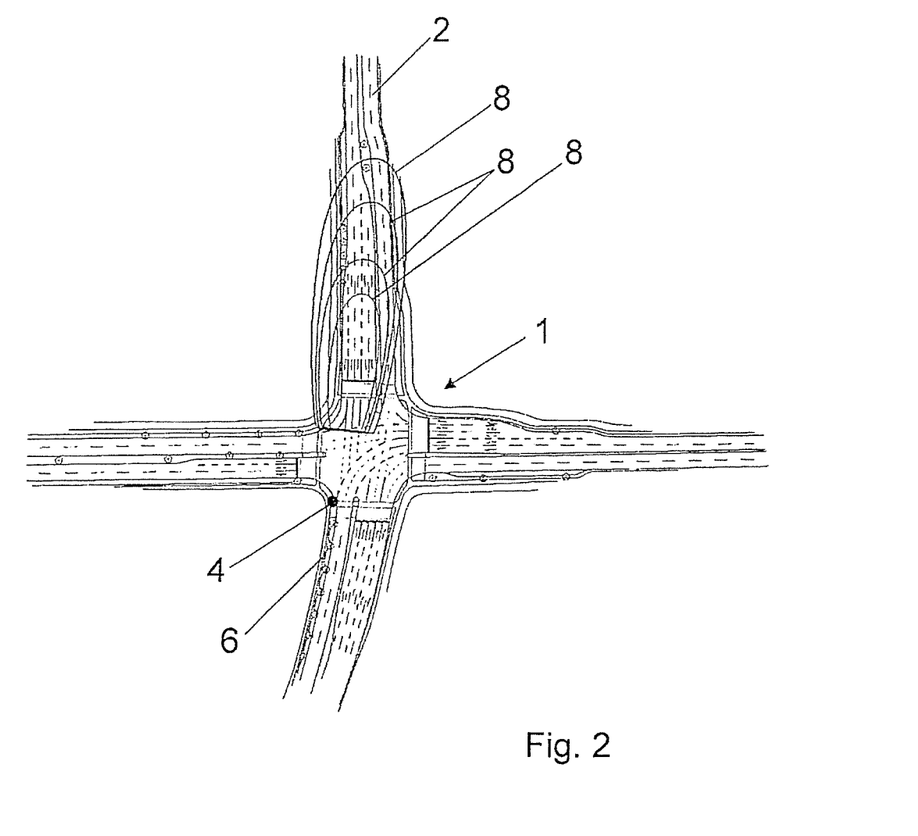

FIG. 2 shows the same situation as FIG. 1, the only difference being that a different transmitting antenna and/or a different receiving antenna is used in the transmitting and receiving device 4. It can be seen that the position of the transmitting and receiving device 4 accords with the position shown in FIG. 1. FIG. 2 shows the plan view of the same junction 1 of the two traffic routes 2. The only difference is that the lines 8 that connect together the points of identical intensity, now describe curves that are longer, and therefore less wide, than is the case in FIG. 1. It can be seen that the outermost line 8, for example, which corresponds to the same intensity as the outermost line 8 in FIG. 1, covers a significantly larger part of the traffic route 2. At the same time, the region which for example is covered to the right on the upper part of the traffic route 2 by the radiation lobe of the transmitting and receiving device 4 is significantly reduced. This can be advantageous in order, for example, to reduce a radiation exposure in this region, or to exploit the emitted transmitted radiation more efficiently. In addition, if the emitted transmitted radiation is focused better, unwanted reflections which can for example be caused by vehicles that are detectable but which are not, however, relevant for the purposes, for example, of the control of a traffic recording installation can be avoided or at least reduced. It is, for example, possible that road sweepers or bulldozers on pedestrian paths are detected as vehicles that cause a traffic light installation to switch. This, however, is neither desirable nor helpful, so that as a result of better focusing of the emitted transmitted radiation the region, for example, of a pedestrian path of this sort does not come into the detection region. The better the emitted transmitted radiation is focused on and matched to the region of the traffic route 2 that is to be monitored, the less transmission power must be used, leading to savings in energy.

Figure 3:
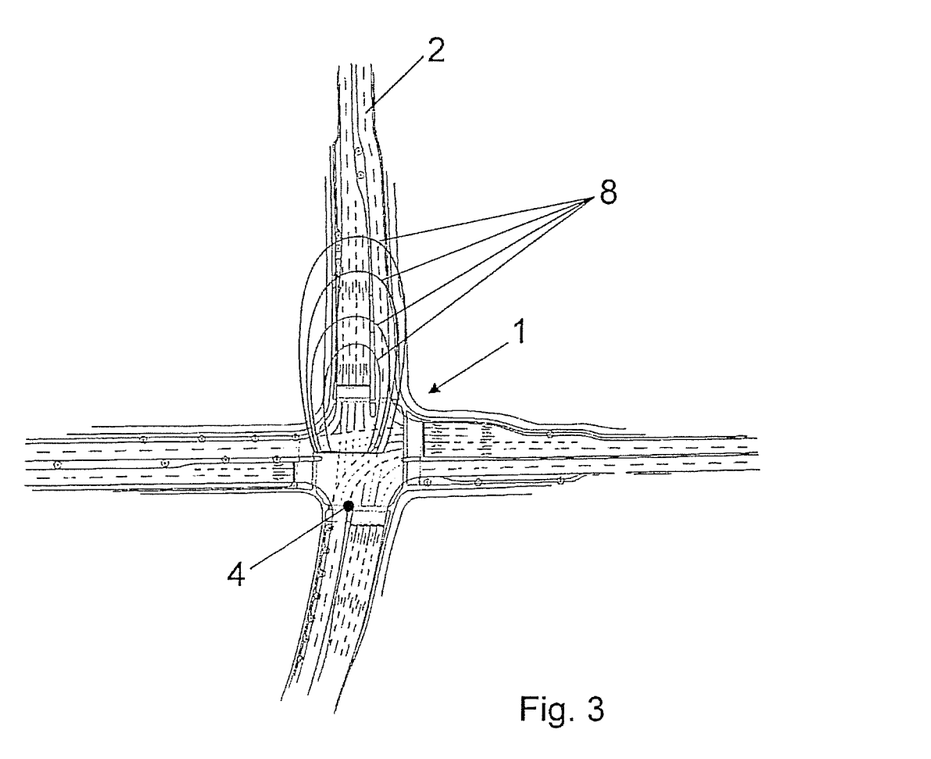

FIG. 3 shows the situation of FIG. 1, with the difference that the transmitting and receiving device 4 is now fastened in the center of the roadway, between the two travel directions, for example on a traffic light suspended above the roadway. The lines 8 of equal intensity correspond in their shape and extension to the lines 8 of FIG. 1, but are now adjusted to the changed position and orientation of the transmitting and receiving device 4. This again leads to a slightly changed detection region, since now, for example, a larger proportion of the region to the left of the upper part of the traffic route 2 is also covered, where this was only true to a limited extent in FIG. 1. The one or the other arrangement can be better, depending on the requirements wanted.

Figure 4:
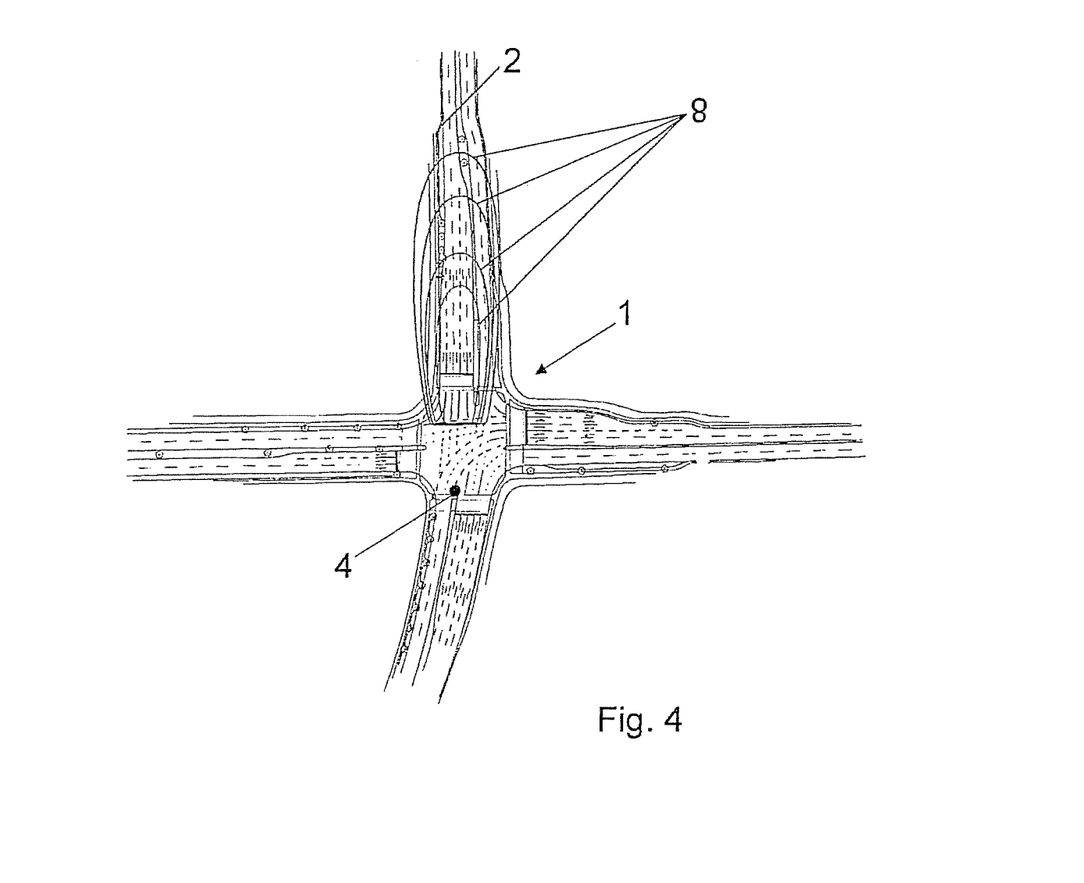

The same situation is illustrated in FIG. 4, with the difference that now the transmitting antenna that was already used for the illustration of FIG. 2 is used for the transmitting and receiving device 4. Here again this leads to longer and therefore less wide radiation lobes, and thus to an altogether longer detection region 12, shown in the illustrated exemplary embodiment by one of the lines 8. Which of the lines 8 is used here depends on a predetermined limit value which the area intensity inside the region delimited by this line 8 should exceed.

Different detection regions, or different area intensity distributions, are thus illustrated in FIGS. 1 to 4, wherein only one transmitting and receiving device 4 is used. Only the position of the transmitting and receiving device 4, and the transmitting antenna used, are varied. In addition or as an alternative to these parameters, it is also of course possible to include angles of inclination, for example relative to the plane of the traffic route 2, opening angles of the receiving device that are responsible for receiving the transmitted radiation reflected by the traffic participants, or additional parameters such as for example the buildings in the region around the junction 1. Calculations of this sort are of course not limited to traffic routes in the form of roads. Railways and waterways, and in principle even aircraft routes can be monitored in this manner.

FIG. 5 shows a schematic sectional view in which again a line 8 is shown connecting together the points of identical intensity. A longitudinal section through a transmission lobe, the lower region of which meets the traffic route 2, can thus be seen. Different measurement planes 10 are illustrated as dotted lines which, in the exemplary embodiment illustrated, are shifted parallel to the traffic route 2. They thus have different distances from the traffic route 2.

The line 8 connects points at which the transmitted radiation emitted by the transmitting and receiving device 4 achieves the same intensity value. Within the indicated region, the radiation intensity is consequently higher. If the intensity of the emitted transmitted radiation being greater than the intensity represented by the line 8 is now selected as the criterion for the determination of the detection region, the reception region consequently is located within the region surrounded by the line 8 in FIG. 5. Since, however, the detection region is not determined directly from the spatial intensity distribution, but from the area intensity distribution determined from that, the selection of the measurement plane 10 has an effect on the detection region 12 that is determined. This is also illustrated in FIG. 5. The detection region 12, whose edges are given by the intersections of the measurement plane 10 with the line 8, is drawn for each of the three illustrated measurement planes 10. It can be seen that the detection region 12 in FIG. 5 shifts to the right when the distance of the measurement plane 10 from the traffic route 2 is increased.

Depending on which traffic participants are to be detected by the transmitting and receiving device 4 described, the measurement plane 10 should advantageously be adjusted to the middle height of the traffic participants. This also applies to an angle of inclination of the transmitting and receiving device 4 relative to the traffic route 2.

LIST OF REFERENCE SIGNS

1 Junction
2 Traffic route
4 Transmitting and receiving device
6 Pedestrian path
8 Line
10 Measurement plane
12 Detection region

The invention claimed is:

1. A method for determining a detection region of a traffic route in which traffic participants can be detected by a transmitting and receiving device,
   wherein the transmitting and receiving device
      is arranged at an installation position in an installation orientation and
      is installed such as to emit a transmitted radiation and to receive reflected transmitted radiation,
   wherein the method comprises the following steps:
      a) calculation of a spatial detection region of the transmitting and receiving device at least also from a device position and a device orientation by means of a 3D model,
      b) determination of an area detection region in a measurement plane from the spatial detection region and
      c) determination of the detection region from the area detection region
   wherein, a radiation lobe shape and/or parameters of the transmitting and receiving device that determine a shape of the radiation lobe are used as variables in the 3D model.

2. The method as claimed in claim 1, wherein at least one transmission lobe and at least one reception lobe of the transmitting and receiving device are taken into account in the 3D model.

3. The method as claimed in claim 2, wherein the spatial detection region comprises all those positions for which an intensity of the radiation exceeds a predetermined limit value which
   was emitted by the transmitting and receiving device,
   was reflected by a test body, in particular a standard body, located at the respective position, and
   was detected by the transmitting and receiving device.

4. The method as claimed in claim 1 wherein the spatial intensity distribution of the transmitted radiation that can be emitted by the transmitting and receiving device is calculated as the spatial detection region, and an area intensity distribution is determined from the spatial intensity distribution as the area detection region.

5. The method as claimed in claim 1 wherein a point in the measurement plane can unambiguously be assigned to each point of the traffic route, and the detection region is that region in which the area intensity distribution determined, or the value of the area detection region, exceeds or reaches a predetermined limit value at the assigned points of the measurement plane.

6. The method as claimed in claim 1 wherein the measurement plane is shifted parallel to the traffic route.

7. The method as claimed in claim 6, wherein a distance between the traffic route and the measurement plane is between 10 cm and 140 cm.

8. The method as claimed in claim 1 wherein the traffic route comprises a junction and/or a traffic light installation.

9. A method for determining a required position and a required orientation of at least one transmitting and receiving device, in which the detection region satisfies at least one predetermined criterion, wherein the method comprises the following steps:

a) determination of the detection region according to a method as claimed in claim 1 for the transmitting and receiving device in a test position and in a test orientation,
b) acceptance of the test position as the required position and the test orientation as the required orientation, provided the detection region determined satisfies the at least one criterion, and changing the test position and/or the test orientation if the detection region determined does not satisfy the at least one criterion,
c) repetition of steps a) and b) until the detection region determined satisfies the at least one predetermined criterion.

10. The method as claimed in claim 9, wherein required positions and the required orientations of a plurality of transmitting and receiving devices are determined.

11. An apparatus with an electrical or electronic controller that is designed for determining a detection region of a traffic route in which traffic participants can be detected by a transmitting and receiving device,
wherein the transmitting and receiving device
is arranged at an installation position in an installation orientation and
is installed such as to emit a transmitted radiation and to receive reflected transmitted radiation,
wherein the electronic controller implements the following steps:
a) calculation of a spatial detection region of the transmitting and receiving device at least also from a device position and a device orientation by means of a 3D model,
b) determination of an area detection region in a measurement plane from the spatial detection region and
c) determination of the detection region from the area detection region
wherein the electronic controller utilizes a radiation lobe shape and/or parameters of the transmitting and receiving device that determine the shape of the radiation lobe as variables in the 3D model.

12. The apparatus as claimed in claim 11, wherein the apparatus is a portable or stationary data-processing device.

13. The apparatus as claimed in claim 12 wherein the apparatus is portable and is selected from the group consisting of a laptop, tablet computer or smartphone.

14. The method as claimed in claim 7 wherein the distance is between 20 cm and 100 cm.

* * * * *